Feb. 12, 1946.   O. J. SUNDSTRAND   2,394,950
TYPEWRITING MACHINE
Filed July 10, 1943   6 Sheets-Sheet 4

INVENTOR
OSCAR J. SUNDSTRAND
BY
*K. G. Julihn*
ATTORNEY

Feb. 12, 1946.    O. J. SUNDSTRAND    2,394,950
TYPEWRITING MACHINE
Filed July 10, 1943    6 Sheets-Sheet 5

INVENTOR
OSCAR J. SUNDSTRAND
BY
ATTORNEY

Feb. 12, 1946.   O. J. SUNDSTRAND   2,394,950
TYPEWRITING MACHINE
Filed July 10, 1943   6 Sheets-Sheet 6

INVENTOR
OSCAR J. SUNDSTRAND
BY
*R. G. Julihn*
ATTORNEY

Patented Feb. 12, 1946

2,394,950

UNITED STATES PATENT OFFICE 2,394,950

TYPEWRITING MACHINE

Oscar J. Sundstrand, West Hartford, Conn., assignor to Underwood Corporation, New York, N. Y., a corporation of Delaware Application July 10, 1943, Serial No. 494,436

21 Claims. (Cl. 197—66)

This invention relates to typewriting machines and combined typewriting and accounting machines, and, more particularly, to line-space mechanisms for such machines. The invention has been particularly designed to be applied to typewriting machines and typewriting and accounting machines of the so-called Elliott-Fisher type having a horizontal flat platen, a line-space frame movable forwardly and rearwardly over the platen and a type carriage mounted on the line-space frame for movement in letter-spacing and return directions. The invention is illustrated in this application as embodied in a machine of this type. Certain features of the invention, however, are not limited in their application to this particular type of machine but may be embodied with advantage in other machines.

Certain objects of the present invention are to improve the construction and mode of operation of line-space mechanisms for typewriting machines and combined typewriting and accounting machines and to produce a machine in which is provided novel mechanism constructed to operate in a certain and reliable manner under power to cause the type mechanism and platen to move relatively to line space accurately the required distance in each line-spacing operation.

In the usual machine of the Elliott-Fisher type, at present in commercial use, the line-space frame, upon which the type carriage is mounted, is held in line-spaced position by a friction brake. This brake is adjusted to operate with a relatively light friction in order not to impose an undue load on the motor when the line-space frame is shifted under power. The result is that the line-space frame is not held firmly in line-spaced position and often is accidentally shifted by the operator in typing a line, thereby spoiling a piece of work.

Also in machines of this type, the line-spacing mechanism is of such a character that its action is often not uniform but said mechanism will overthrow or underthrow under different conditions.

Another object of the invention is to provide a line-space mechanism and cooperating devices for this type of machine which will locate the line-space frame exactly on the required line, which will hold the line-space frame firmly against displacement during typing and will not furnish undue resistance to the movement of the line-space frame when the frame is shifted either by the operation of the manual shift mechanism or by the power operated mechanism.

Another object of the invention is to produce a line-space mechanism for Elliott-Fisher machines which will hold the line-space frame securely against accidental displacement and at the same time will enable the operator to shift said frame forwardly or rearwardly by moving directly the frame.

Another important object of the present invention is to produce a line-space mechanism for machines of this type which will act uniformly and accurately to move the line-space frame the desired line-space distance during each line-spacing operation.

With the above and other objects in view, the invention consists in a machine embodying the novel and improved features, constructions, and combinations of parts hereinafter described and particularly pointed out in the claims, the advantages of which will be readily understood and appreciated by those skilled in the art.

The invention will be clearly understood from the accompanying drawings illustrating the invention in its preferred form and the following detailed description of the constructions therein shown.

The invention is illustrated in this application as applied to a typewriting and accounting machine of the Elliott-Fisher type having the same general construction, arrangement, and mode of operation of parts as the machine illustrated and described in the patent to Foothorap No. 1,904,-127, dated April 19, 1933.

In the illustrated construction (see Fig. 1), the machine comprises a platen frame provided with side rails or bars 2 connected together in spaced relation by transverse or cross bars (not shown) and a substantially flat platen 4 mounted for vertical movement in said frame. Upon the side rails 2 of the platen frame is supported a line-space frame movable forwardly and rearwardly on tracks formed upon the upper edges of said rails to line space the type carriage with relation to the platen. The line-space frame comprises side brackets or bars 6 connected by front and rear rails 8 and 10. The line-space frame is provided with wheels or rollers 12 and 13 which engage tracks respectively on the upper edges of the rails 2 of the platen frame to enable the line-space frame to move readily over the platen frame.

The mechanism for moving the line-space frame comprises a shaft 14 rotatably mounted in bearings in said frame, the shaft extending substantially parallel with the front and rear rails of the frame. Upon the shaft are fixed gears 16 which mesh with the teeth of the racks 18 secured to the side rails 2 of the platen frame. The shaft is given a predetermined angular movement in a counterclockwise direction, Figures 8, 10, and 11, to impart a line-spacing movement to the line-space frame.

Upon the line-space frame is mounted a type carriage or head indicated as a whole at 20 upon which are supported the usual series of type bars 21 each carrying one or more types 21a for engaging the work sheets supported on the platen. The type-bar mechanisms may be constructed and arranged as in the machine illustrated and described in the patent to Foothorap No. 1,251,-361, dated December 25, 1917, in which said mechanisms are operated by the fingers of the operator, or the type-bar mechanisms may be constructed and arranged to be operated by power-driven mechanism, as shown and described in applicant's copending application Serial No. 281,-772, filed June 29, 1939 which matured as Patent No. 2,370,505 dated February 27, 1945. In the construction shown in said application, said power-driven mechanism is carried in part by the type carriage. The carriage also carries the usual series of keys forming the keyboard of the machine and controlling the coaction of the type bars with the power-driven mechanism. The carriage also carries a master wheel by which the totalizers or registers are driven and mechanism for driving the master wheel differently by power to set up or enter successively the various digits of a number step by step in a register.

The type carriage is supported for movement forwardly and rearwardly with the line-space frame and is also mounted on said frame for lateral movement in a right-hand direction to letter space during a typing operation and for return movement in a left-hand direction to restore the carriage to position for starting the typing of a line. The carriage is provided with front and rear wheels or rollers such as 22 arranged to engage respectively the front and rear rails 8 and 10 of the line-space frame. The carriage is acted upon by the usual metallic band 26 having one end attached to the carriage and connected with the usual spring drum 28 which tends yieldingly to move the carriage constantly in a right-hand direction along the rails of the line-space frame. The letter-spacing movement of the carriage is controlled by the usual escapement mechanism.

*Carriage return mechanism*

The machine is also provided with power-operated mechanism for returning the carriage to the left, either to full return or to partial return position at the right of its full return position after it has advanced along the line-space frame in the operation of printing a line. The machine illustrated in the present application is provided with an electric driving motor 32, Figures 3 and 7, mounted on a suitable bracket secured to the line-space frame with which it travels as in Foothorap Patent No. 1,904,127, referred to above. The motor is arranged to be driven continuously during the use of the machine and is provided with the usual electrical connections 33 forming a circuit controlled by an ordinary manually operated switch 35.

Figures 3, 4, 5, 6:
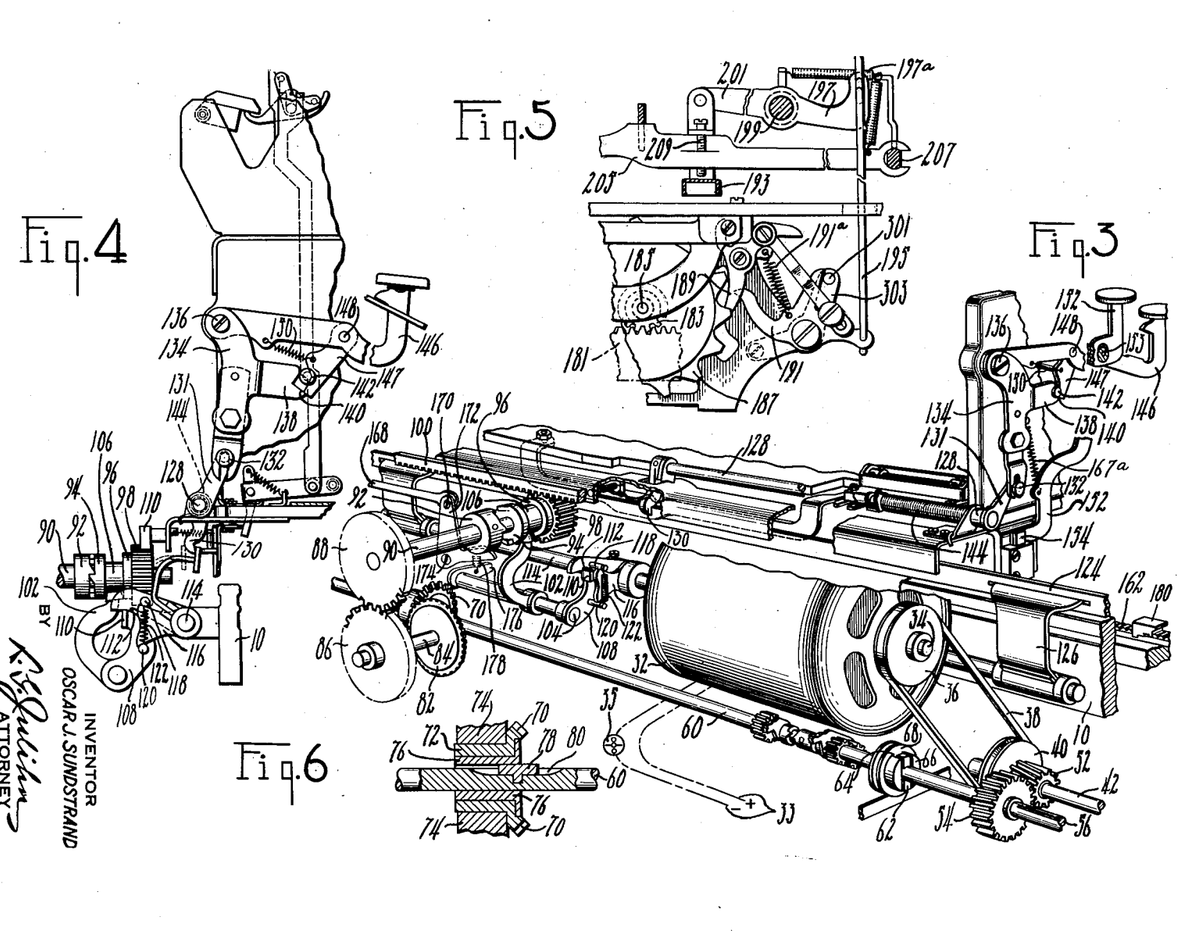
Figure 3 is a perspective view taken from the rear of the machine and illustrating particularly the carriage-return mechanism.
Figure 4 is a detail view in side elevation taken from the left-hand side of the machine and illustrating a portion of the mechanism shown in Figure 3 and certain associated parts with certain of the parts in different positions.
Figure 5 is a detail view illustrating the carriage-feeding or escapement mechanism in rear elevation, and certain parts of the controlling means therefor in side elevation.
Figure 6 is a detail sectional view illustrating certain parts of the driving connections shown in Figure 3.
Figure 7:
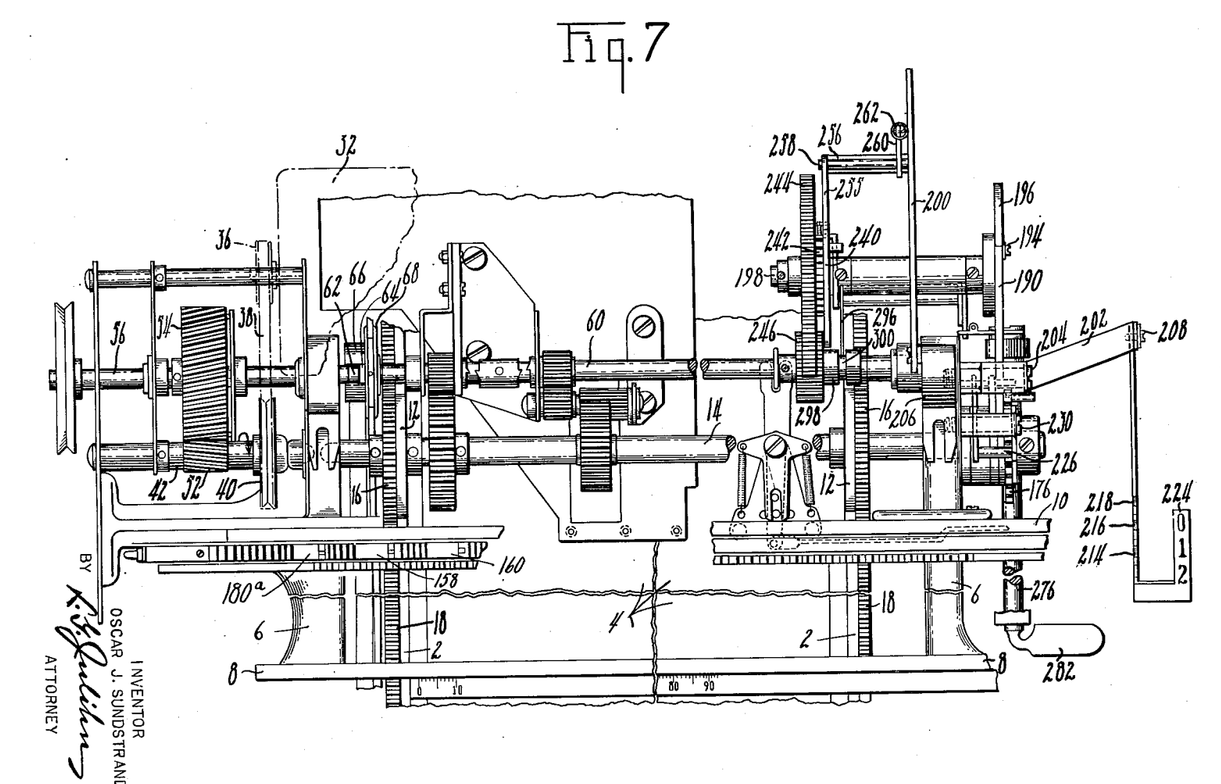
Figure 7 is a plan view illustrating portions of the platen frame, platen, and line-space frame of the machine and the driving mechanism for shifting the line-space frame.

The motor is provided with a shaft 34 carrying a belt pulley 36 which is connected by a belt 38 with a pulley 40 journalled upon a fixed shaft 42 supported on the line-space frame, as described in Patent No. 2,370,505. Attached to the pulley 40 is a spiral gear 52 meshing with a spiral gear 54 secured to the shaft 56 rotatably mounted in bearings carried by the line-space frame. The shaft 56, which is longitudinally fixed in its bearings, is arranged to drive the longitudinally movable shaft 60 which is also mounted in suitable bearings in the line-space frame and the driving connection between the shaft 56 and the shaft 60 is arranged to accommodate the longitudinal movements of the shaft 60. In the construction shown, a cross bar 62, Figures 3 and 7, is secured to the inner end of the shaft 56 and engages in a slot 64 formed between the projections 66 extending laterally from a disk 68 attached to the end of the longitudinally movable shaft 60. The slot between the projections 64 is sufficiently deep to allow considerable longitudinal movement of the shaft 60 while maintaining the cross bar 62 engaged in said slot.

The driving connections between the shaft 60 and the type carriage comprise a bevel gear 70 having a bearing portion or sleeve 72, Figure 6, engaging in a bearing in a portion 74 of the line-space frame, to which sleeve the gear is secured, and having a central bushing 76 to which the sleeve 72 is fixed. The driving connection between the shaft 60 and the gear comprises a key 78 secured to the shaft and engaging in a keyway or groove 80 in the bushing 76, this construction being provided to accommodate the longitudinal movement of the shaft while the gear remains stationary.

The bevel gear 70 meshes with a bevel gear 82 fixed to the forward end of the counter shaft 84 mounted in a suitable bearing on the line-space frame. To the rear end of the shaft 84 is fixed a gear 86 meshing with a gear 88 secured to the rear end of the carriage-return counter shaft 90 (see Figures 3 and 4) also mounted in suitable bearings in the line-space frame and having the driving member 92 of the carriage-return clutch secured thereto. The driven member 94 of said clutch is fixed to one end of a sleeve 96 rotatable and longitudinally movable on the shaft 90, upon which is mounted the relatively wide carriage-return pinion 98 meshing with the teeth of the rack 100 secured to the carriage 20.

The carriage-return drive mechanism is thrown into operation by moving the sleeve 96 longitudinally of the shaft 90 to engage the driven member 94 of the carriage-return clutch with the driving member 92 thereof and the carriage-return drive mechanism is thrown out of operation when the carriage reaches a predetermined point in its return movement by moving the sleeve 96 longitudinally of the shaft 90 to disengage the driven member of the clutch from the driving member thereof. The sleeve 96 is moved longitudinally of the shaft 90 to engage and disengage the carriage-return clutch by means comprising a carriage-return bail and connections between the same and the sleeve having substantially the same construction, arrangement, and mode of operation as the corresponding mechanism shown and described in the above Foothorap Patent No. 1,904,127.

The mechanism for controlling the movement of the clutch sleeve 96 to engage the driven member of the carriage-return clutch with the driving member and to disengage the driven member from the driving member comprises a clutch-shifting arm 102 fixed to a rock shaft 104 mounted in bearings in the line-space frame, said arm having its free end engaged in a groove 106 in the sleeve. A clutch-shifting arm 108 is secured to the other end of the shaft 104 and is provided with a lateral locking lip 110 engaged by a hooked latch 112 pivoted on a trip rock shaft 114 extending across the machine and supported in bearings in the line-space frame. A fan-shaped trip arm 116 fast on the trip shaft 114 extends rearwardly between two studs 118 and 120 projecting respectively from the hooked latch 112 and from the clutch-shifting arm 108, a normally tensioned spring 122 connecting the two studs to form a yielding link therebetween and normally maintaining the hooked latch 112 engaged with the clutch-shifting arm 108 to retain the members of the carriage-return clutch disengaged.

Figures 1, 2:
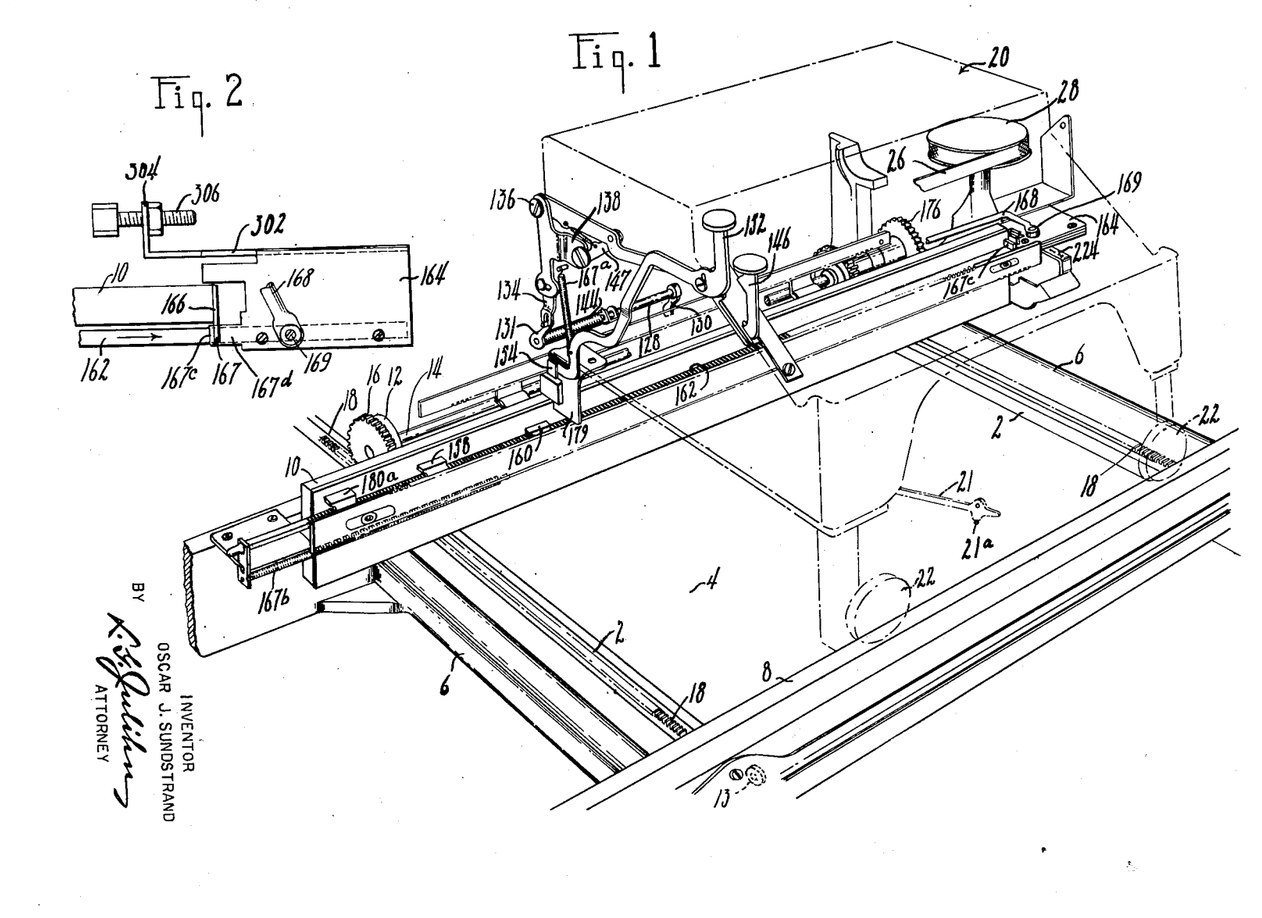
Figure 1 is a perspective view illustrating certain parts of a typewriting machine of the Elliott-Fisher type embodying the invention.
Figure 2 is a detail plan view illustrating certain parts of the mechanism for arresting the return movement of the type carriage.

A tripping bail 124 is mounted at the outer ends of the standards 126 secured to the trip rock shaft 114. This tripping bail normally occupies a rearward position, as shown in Figures 1 and 3, to maintain the members of the carriage-return clutch disengaged. The bail is automatically swung forwardly as the carriage reaches the end of a line to throw in the carriage-return clutch and cause the carriage to be returned to full return position, by mechanism (not shown herein) having the same construction and mode of operation as the corresponding mechanism illustrated and described in applicant's Patent No. 2,283,401, dated May 19, 1942. The machine is also provided with mechanism for swinging the bail forwardly to engage the carriage-return clutch upon depression of any one of a plurality of carriage-return keys. Automatic mechanism is also provided which, when the carriage reaches the desired return position, swings the bail rearwardly to disengage the carriage-return clutch.

The key-operated mechanism for actuating the bail to throw in the carriage-return clutch (see Figures 1, 3, and 4) comprises a rock shaft 128 mounted in bearings carried by the type carriage, to which shaft is fixed an arm 130 arranged to engage the rear face of the bail 124 as shown in Figures 1, 3 and 4. To the other end of the rock shaft 128 is secured a second arm 131 which carries a stud 132 engaging in a slot in the downwardly extending arm of a lever 134 pivoted on the side plate of the type carriage at 136. Another arm 138 of the lever is provided with a lip 140 arranged normally to engage a rigid pin 142 projecting laterally from the side plate of the type carriage, as shown in Figure 3, the parts being shown in this figure in the positions which they assume when the bail 124 is in its rearward position with the members of the carriage-return clutch disengaged. The rock shaft 128 is acted upon by a coil spring 144 which normally holds the shaft in position with the bail-actuating arm 130 in its rearward position, as shown in Figures 1 and 3.

The lever 134 is swung rearwardly to actuate the rock shaft 128 and the bail-actuating arm 130 to cause the engagement of the carriage return clutch by means comprising a key lever 146 also pivoted at 136 on the side plate of the type carriage and provided with a by-pass pawl 147 pivoted at 148 on the lever and arranged to engage the lip 140 on the lever 134. This pawl is acted upon by a coil spring 150 which tends to swing the same to the left (Figures 1, 3, and 4) and maintains the same in engagement with the stud 142, the pawl having a cam face on its left-hand side which engages said stud (see Figure 4).

With the above construction, upon the depression of the key lever 146, the lever 134 is first swung to the left by the engagement of the pawl with the lip 140 thereby swinging the rock shaft 128 and the bail-actuating arm 130 in a direction to cause the engagement of the carriage-return clutch and the pawl is then cammed off the lip 140. Upon the release of the key lever, the lever and pawl are restored to the positions shown in Figure 3 so that the pawl will be in position again to engage the lip 140 on the lever 134, said lever having been restored to its normal position by the action of the spring 144.

The machine is provided with mechanism for arresting the return movement of the carriage selectively with the carriage in fully returned position, or with the carriage in either of two partial return positions, as illustrated and described in applicant's Patent No. 2,283,401. The mechanism for controlling the return movements of the carriage and for stopping the same in the desired position comprises a key lever 152 having a lost-motion connection with the key lever 146 through a stud 153 mounted on lever 146 and engaging in a slot in the lever 152. The lever 152 carries on its lower end a protrudable stop 154 arranged to be projected downwardly to different positions so as to engage selectively the stop blocks or arresters 158 and 160 of different heights, adjustably mounted on the longitudinally movable draft rod 162. To stop the carriage in full return position, an abutment or stop plate 179 is secured to and depends from the left-hand side of the carriage and is arranged to engage a stop block or arrester 180a adjustably mounted on the draft rod 162 as the carriage approaches the end of its full return movement. The stop plate extends downwardly a predetermined distance below the carriage so as to pass over the arresters 158 and 160 during the return of the carriage and to engage the arrester 180a which projects above the latter two arresters. A slide plate 164, preferably formed of sheet metal, is attached to the right-hand end of the draft rod and carries a stop 165 (see Figure 2) arranged to engage a stop plate 166 fixed to the right-hand end of the rear rail 10 forming part of the line-space frame. The engagement of the stop 165 with the stop plate 166 arrests the left-hand movement of the draft rod 162 and thereby arrests the return movement of the carriage. The stop plate 166 is provided with a lateral extension 167 arranged to extend over a projection 167d on the slide plate 164 and constituting a guide for said plate. The draft rod is acted upon by a coil spring 167b which tends constantly to move the rod to the right, Figure 1, and maintains the same normally in the position shown in Figures 1, 2, and 9. The movement of the draft rod and slide plate 164 under the influence of the spring is limited by the engagement of an upturned portion 167c on the projection 167d on the slide plate with the extension 167 on the stop plate. With the above construction, assuming that the carriage-return mechanism has been thrown into operation by the depression of the key lever 146 or the key lever 152 and that the carriage is executing its return movement, as the carriage approaches the end of said movement, the stop plate 179 engages the arrester 180a or the projectable stop 154 engages one of the arresters 158, 160 and the draft rod 162 is moved to the left with the carriage against the action of the spring 167b, and carries the slide plate 164 to the left therewith. When the carriage reaches a predetermined position, the movement of the carriage is arrested by the engagement of the stop 165 on the slide plate with the stop plate 166. The lever 152 and the stop 154 are restored to their upper positions by means of a coil spring 167a.

The mechanism for actuating the carriage-return bail 124 to disengage the carriage-return clutch prior to the stopping of the carriage, comprises a longitudinally movable rod 168 pivotally connected at 169 with the slide plate 164 and arranged to be actuated from said slide plate. The left-hand end of the rod 168 is pivotally connected at 170 (see Figure 3) with a bell crank lever 172 pivoted at 174 on the line-space frame. The other arm of the bell crank lever 172 extends over and is arranged to engage an arm 176 fixed to the rock shaft 104. The arm 176 is acted upon by a coil spring 178 which tends to swing the arm upwardly and to swing the arm 102 in a direction to engage the members of the carriage-return clutch. The members of the clutch are normally held out of engagement, however, by the engagement of the hooked latch 112 with the clutch-shifting arm 108. With this construction, upon the left-hand movement of the slide plate 164 as the carriage approaches the end of its return movement, the bell crank lever 172 is actuated by the rod 168 to swing the arm 176 downwardly and to turn the rock shaft 104 to disengage the carriage-return clutch.

Except, as herein described, the parts of the mechanisms for returning the carriage to position to begin a line of typing and for stopping the return movement of the carriage disclosed in this application, have substantially the same construction, arrangement, and mode of operation as the corresponding parts of the mechanisms shown and described in applicant's Patent No. 2,283,401. When either the lever 146 or the lever 152 is depressed and quickly released, the carriage-return mechanism is thrown into operation, the carriage is driven in a return direction, and the movement of the carriage is stopped with the carriage in fully returned position by the engagement of the fixed stop 179 on the carriage with the arrester 180a. When the lever 146 is depressed and held in depressed position, the carriage-return mechanism is thrown into operation, and the carriage is arrested in partial return position by the engagement of the stop 154 with the arrester 158. When the lever 152 is depressed and held in depressed position, the carriage-return mechanism is thrown into operation, and the carriage is stopped in another partial return position, to the right of the first partial return position, by the engagement of the stop 154 with the arrester 160.

The shaft 60 is continuously rotated from the motor 32 through the driving connections described. The shaft 14 may be driven in opposite directions under control of the operator to drive the line-space frame forwardly or rearwardly from the shaft 60, through suitable driving connections, such as shown and described in the copending application of Elmer L. Wise, Serial No. 383,950, filed March 18, 1941, which matured as Patent No. 2,340,257 dated January 25, 1944.

Escapement mechanism

The present machine is provided with the usual escapement mechanism for controlling the letter-spacing movement of the type carriage. This mechanism preferably has substantially the same construction, arrangement, and mode of operation as the corresponding mechanism illustrated and described in the patent to Foothorap No. 1,203,519 (see Figure 5). This escapement mechanism comprises a carriage-feed rack 181 secured to the rear rail 10 of the line-space frame, and a feed pinion 183 journaled on a shaft 185 having its ends engaged in suitable supports on the frame of the type carriage. To this pinion is fixed an escapement wheel 187 controlled by escapement dogs 189 and 191 connected by a spring 191a and operated from the universal bar 193 by means of the usual draw wire. This draw wire, indicated at 195, is connected at its upper end with an arm 197 attached to a rock shaft 199 arranged transversely of the type carriage. Spaced arms, such as 201, are fixed to this rock shaft from which arms is suspended the universal bar 193. This bar extends beneath the several levers 205 pivoted on the shaft 207 and is arranged to be engaged by an abutment screw 209 mounted in each of these levers. The levers 205 may be either the intermediate levers of type-bar mechanisms, such as shown and described in applicant's Patent No. 2,370,505, or they may consist of key levers of a construction such as that shown and described in the patent to Foothorap No. 1,251,361, dated December 25, 1917. The depression of the universal bar 193 by the downward movement of any one of the levers 205 swings the rock shaft 199 in a counterclockwise direction (Figure 5), thereby swinging upwardly the arm 197 to swing the holding dog 189 out of operative position and to swing the spacing dog 191 into operative position. The rock shaft is acted upon by a return spring 197a connected with an arm fixed to the shaft which acts to turn the rock shaft back in a clockwise direction upon the release of the universal bar 193 by the lever 205. This movement of the rock shaft swings the arm 197 back downwardly and allows the draw wire 195 to descend, and the spacing dog 191 is swung out of operative position and the holding dog 189 is swung back into operative position by the action of the spring 191a. The movement of the spacing dog out of operative position is limited by means of a pin 301 mounted in a fixed arm 303 extending from a bracket constituting one of the supports for the escapement mechanism, said pin being engaged by an arm on the dog to limit the movement of the dog.

In the present form of the invention, the linespace frame is advanced to line space the type carriage, by mechanism driven from the shaft 60 which imparts line-spacing movements to the shaft 14 (see Figures 7 to 15 inclusive). This mechanism comprises a coarse toothed wheel 176 secured to the right-hand end of the shaft 14 and a driving dog or pawl 178 for engaging said wheel. The line-spacing pawl 178 is pivoted on a stud 180 carried at the outer end of a swinging pawl carrier 182 pivoted on the shaft 14 and acted upon by a spring 182a which tends constantly to swing the carrier in a clockwise direction, Figure 8. The pawl is formed at its outer end with a slot 184 in which engages a pin 186 mounted in the outer end of a driving arm 188 pivotally supported on the shaft 14 to swing about the axis of said shaft by the side of the pawl carrier 182 and acted upon by a spring 188a which tends to constantly swing said arm in a clockwise direction, Figure 8. To the pin 186 is connected a link or pitman 190 provided with a slot 192 having the formation and arrangement shown in Figures 8 and 10 to 15 inclusive in which engages a crank pin 194 mounted on a disk 196 fixed to one end of a shaft 198. The shaft 198 is journaled in a suitable bearing supported on a bracket 200 attached to the line-space frame and is driven through a single revolution from the shaft 60 by means of a clutch of the one-revolution clutch type to impart a line-spacing movement to the line-space frame. Clutches of this type may be hereinafter referred to as "predetermined revolution clutches."

Figures 8, 12:
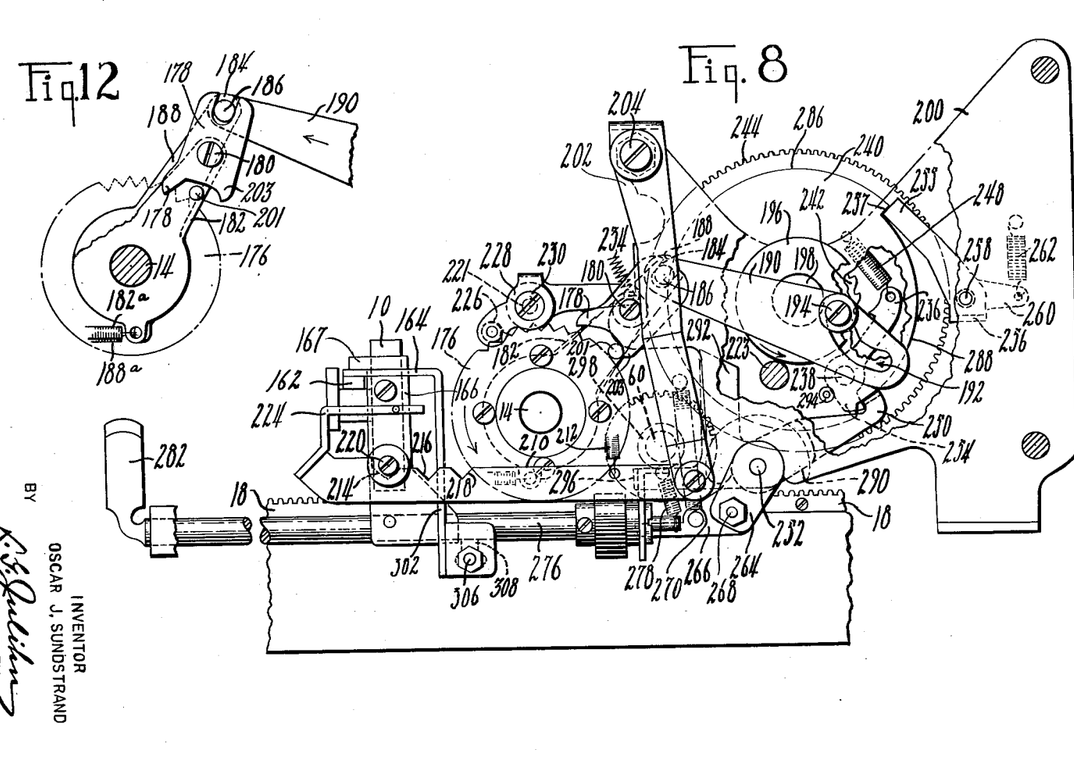
Figure 8 is a view in side elevation taken from the left-hand side of the machine and illustrating particularly the mechanism for actuating the line-space frame to line space.
Figure 12 is a detail view in side elevation illustrating certain of the parts shown in Figures 8, 10, and 11, and Figures 13, 14, and 15 are detail views similar to Figures 10 and 11 illustrating certain of the parts in still different positions.

The pivotal movement of the driving pawl 178 in a clockwise direction, Figure 8, is limited by means of a fixed stop pin 201 mounted on the pawl carrier 182 and arranged to be engaged by a projection 203 on the pawl.

Figures 10, 11:
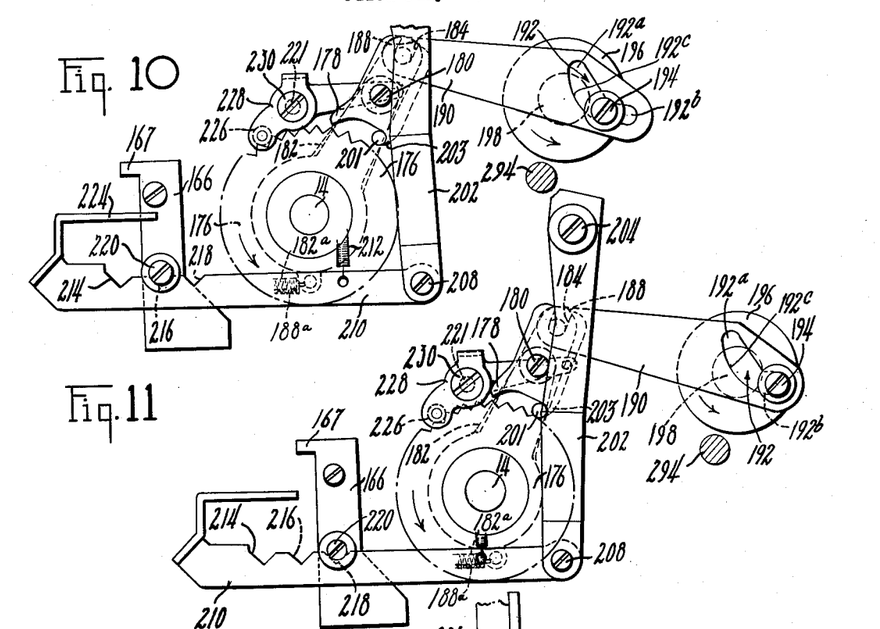
Figure 10 is a detail view in side elevation illustrating a portion of the mechanism shown in Figure 8 with certain of the parts in different positions.
Figure 11 is a detail view similar to Figure 10 illustrating certain of the parts in still different positions.

Figures 8, 10, and 11 show clearly the angular position of the crank pin 194 at the beginning of a revolution of the shaft 198 to impart a linespacing movement to the shaft 14, the disk 196 and crank pin rotating in the direction of the arrows shown in said figures. During the rotation of the crank pin, substantially the entire throw of said pin may be imparted to the driving pawl 178 and the toothed wheel 176 to give the maximum line-spacing movement to the shaft 14, or a portion only of the throw of said crank pin may be imparted to said parts to give a less line-spacing movement to said shaft. The parts may also be adjusted so that the movement of said crank pin will impart no line-spacing movement to the driving pawl 178 and the toothed wheel 176.

The portion of the throw of the crank pin 194, which is imparted to the driving pawl 178 and the toothed wheel 176, is controlled by an adjustable control lever 202 pivoted on a bearing stud 204 fixed in the portion 206 of the line-space frame. The lever 202 extends downwardly from the bearing stud to the rear of the pivot pin 180 of the driving pawl 178 so as to be engaged by the extended head of said pin to limit the rearward movement of the pawl, the pawl carrier, the driving arm 188 and the link or pitman 190. To the lower end of the lever 202 is pivotally connected at 208 a manually adjustable bar 210 which is yieldingly drawn upwardly by means of a coil spring 212. The bar 210 is adjustable forwardly and rearwardly to adjust the position of the lever 202. In order to hold the bar in any one of three adjusted positions, the bar is formed with a series of notches 214, 216, 218 in which is engaged alternatively a retaining stud 220 fixed to the stop plate 166, the spring 212 acting to hold up the bar and thereby hold the stud in any one of the notches when the bar 210 has been adjusted. The bar 210 extends forwardly beyond the rear rail 10 and associated parts so that its forward end may be grasped by the operator to adjust the same, and a scale plate 224, having a suitable scale thereon, is attached to the forward end of the bar.

Figure 8 of the drawings shows the bar 210 and the lever 202 adjusted so that the full throw of the crank pin 194 is imparted through the pitman 190 to the driving pawl 178 and the toothed wheel 176. As shown in this figure, the bar 210 and the lever 202 are adjusted in their rearmost positions, the stud 220 being engaged in the forward notch 214 in the bar 210. In this position of the lever and bar, the position of the pitman 190, when the parts are in normal at rest positions, ready to execute a line-spacing cycle of movement, is such that the crank pin 194 is substantially engaged with the forward end of the curved slot 192. With this adjustment of the control lever 202, the shaft 14 is rotated during a revolution of the crank pin 194 preferably a distance to impart a "double space" linespacing movement to the line-space frame corresponding to two normal or standard single line spaces. When the bar 210 and the lever 202 are adjusted in the position shown in Figure 10 of the drawings, the engagement of the pin 180 with the lever 202 prevents the driving pawl 178, the pawl carrier 182, the driving arm 188, and the pitman 190 from moving back to their limiting rearward positions, the crank pin 194 occupying a position between the ends of the slot 192 when the parts are in their normal at rest positions, ready to execute a line-spacing cycle. With this adjustment of the parts, the crank pin 194 has a considerable amount of lost motion during the first part of a revolution of the shaft 198 and disk 196 from starting position until said pin engages the forward end of the slot 192. Thereafter, the remaining portion of the throw of the pin actuates the driving pawl and the toothed wheel 176 to impart line-spacing movements to the shaft 14. The parts are preferably constructed so that, with this adjustment of the control lever 202, the shaft 14 will be rotated during a revolution of the shaft 198 and disk 196 to impart a line-spacing movement to the line-space frame corresponding to a single normal or standard line space.

When the bar 210 and the lever 202 are adjusted in the position shown in Figure 11 of the drawings, the engagement of the pin 180 with the lever 202 holds the driving pawl 178, the pawl carrier 182, the driving arm 188, and the pitman 190 in forward positions, as shown in this figure, the crank pin 194 occupying the rearward portion of the slot 192 in the pitman 190 when the parts are in their normal at rest positions. With the parts in these positions, the crank pin 194 moves forwardly in the slot 192 during the greater part of the first half revolution of the disk 196 from starting position without moving the pitman 190 forwardly. During the latter part of said half revolution, said crank pin engages the forward wall of the slot and moves the pitman 190, the pawl carrier, and the pawl forwardly. This movement of the pawl, however, is not sufficient to actuate the toothed wheel 176. During the first part of the second half revolution of the disk 196, the pitman, pawl carrier and pawl follow the crank pin in its rearward movement until the stud or pin 180 engages the control lever 202. The crank pin then moves back to the rear end of said slot during the remainder of the second half revolution of said disk. Therefore, with this adjustment of the parts, the driving pawl 178 is not actuated to rotate the toothed wheel 176 and the shaft 14, and no line-spacing movement is imparted to the line-space frame.

The teeth of the coarse toothed wheel 176 may have any spacing suitable to produce the desired result in the operation of the line-spacing mechanism. Preferably, however, these teeth are located at an angular distance apart corresponding to a normal or standard "single space" line-spacing movement of the line-space frame. With the adjustment of the control lever 202 in the position shown in Figure 8, during each advance of the driving pawl 178, the wheel 176 is rotated an angular distance of two teeth. With the lever 202 adjusted in position shown in Figure 10, during each advance of the driving pawl 178, the toothed wheel 176 is rotated a distance of one tooth.

Figure 13:
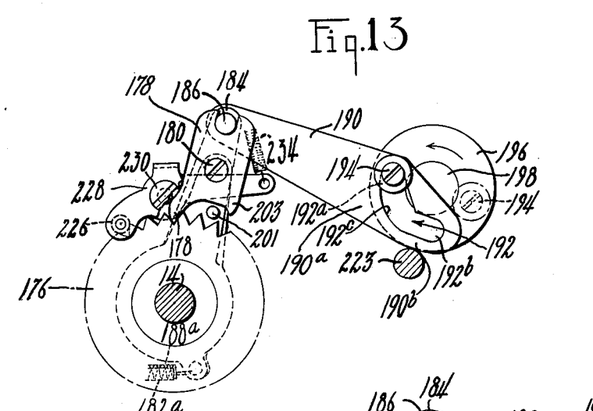
Figure 14:
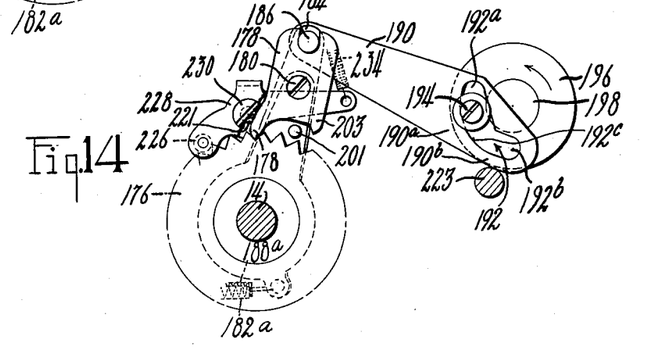

At the end of the forward or line-spacing movement of the line-space mechanism, the pawl 178 is locked in engagement with the teeth of the wheel 176 by means of a stud 230 fixed in the upright 206 on the line-space frame and extending over the toothed wheel 176. This stud is engaged by the pawl at a point adjacent the acting end of the pawl or between the pivot of the pawl and said acting end substantially at the completion of the advance movement of the pawl as shown in Figures 13 and 14. The engagement of this stud with the pawl forces the acting end of the pawl against the teeth of the wheel and locks the wheel against further forward movement thereby effectively preventing overthrow.

In order to hold the line-space frame in a reliable manner from shifting forwardly or rearwardly, except when a line-spacing movement is imparted thereto and to enable the required line-spacing movements readily to be imparted to said frame, a yielding detent mechanism is arranged to act on the toothed wheel 176. This detent mechanism comprises a detent roll 226 mounted between the spaced, forwardly extending arms of a detent lever 228, pivoted on the stud 230 on the line-space frame, said roll being arranged to engage between the teeth of the toothed wheel 176. The roll is yieldingly pressed between the teeth of the wheel by means of a coil spring 234 attached at its opposite ends, respectively, to a rearwardly extending arm on the lever 228 and to a point on the line-space frame. The engagement of the roll 226 between the teeth of the wheel 176 will furnish sufficient resistance to the turning of the wheel to hold the line-space frame from displacement forwardly or rearwardly during the normal operation of typing. When the driving pawl 178 is actuated to rotate the wheel 176 to shift the line-space frame, the roll 226 will yield readily to the action of said pawl.

The one-revolution clutch for driving the shaft 198 (see Figures 7, 8, and 9) comprises a driven clutch pawl 236 pivoted at 238 on a disk 240 attached to the inner end of the shaft 198. The clutch pawl 236 is arranged to engage the teeth of a toothed clutch wheel 242 attached to a gear 244 journaled on the shaft 198. This wheel is continuously driven from the shaft 60 by means of a pinion 246 secured to the shaft 60 and meshing with the gear 244.

The pawl 236 is acted upon by a coil spring 248 connecting the same with a point on the disk 240 which tends to swing the pawl in a direction to engage the acting end of the pawl with one of the teeth of the toothed wheel 242 to clutch the disk 240 and the shaft 198 to the gear 244. The pawl is held out of engagement with the toothed wheel 242 by means of a clutch-controlling or clutch disengaging arm 250 fixed to the left end of a transverse rock shaft 252 mounted in bearings in the line-space frame, said arm having a laterally turned portion arranged to engage a contact arm 254 on the pawl. The disk 240 is held from reverse rotation, upon the release of the pawl from the toothed wheel 242, by means of an arm 255 on a lever 256 arranged to engage a shoulder 257 on the disk. The lever 256 is pivoted on a pin 258 fixed at its right-hand end in the frame plate 200 on the line-space frame and is formed with an arm 260, acted upon by a coil spring 262 which maintains the arm 255 in engagement with the disk 240.

Manually operated mechanism is provided to cause the clutch-controlling arm 250 to swing downwardly to release the pawl 236 and cause the engagement of the one-revolution clutch at the will of the operator. The clutch-controlling arm 250 is also controlled by the carriage-return mechanism so that said arm is swung downwardly to cause the engagement of the one-revolution clutch as the carriage is returned to a predetermined left-hand position.

The mechanism for controlling the position of the clutch-controlling arm 250 comprises an arm 264 attached to the right end of the rock shaft 252 and a second arm 266 fixed to the arm 264. The arm 266 is acted upon by a coil spring 270 which tends to swing the arms 266 and 264 upwardly and to swing the clutch-controlling arm 250 downwardly to allow the clutch to engage. The arm 250 is held in clutch-disengaging position by means of a laterally extending arm 272 (see Figure 9) formed on a plate 274 attached to the rear end of a forwardly and rearwardly extending rock shaft 276 mounted in suitable bearings in the line-space frame, the arm 272 engaging the upper side of the arm 266 adjacent the forward end thereof. The arm 272 is acted upon by a coil spring 278 attached at one end to plate 274 and at the other to a pin 280 mounted on the line-space frame, the strength of which spring 278 is sufficiently great to overcome the tension of the spring 270 thereby to normally maintain the clutch-controlling arm 250 in clutch-releasing position, as shown in Figure 8. To the forward end of the rock shaft 276 is fixed an operating arm 282 by which the rock shaft and the parts connected therewith may be manipulated. In order to limit the rocking movement of the rock shaft and assorted parts, a stop arm 284 is formed on the plate 274 and is arranged to engage the pin 280 to limit the movement of the rock shaft and plate 274 in a counter-clockwise direction, Figure 9.

Figure 9:
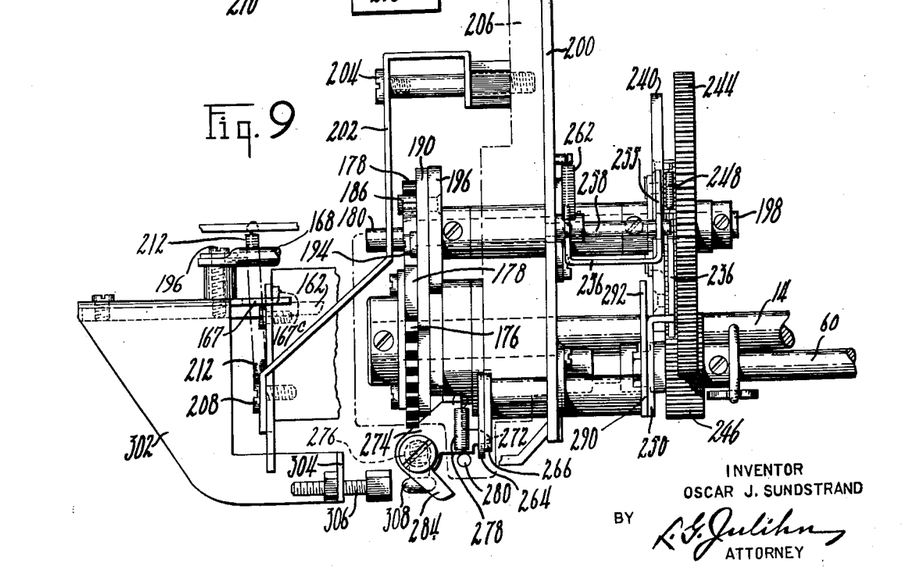
Figure 9 is a view in rear elevation of the mechanism shown in Figure 8.

Figures 8 and 9 show the positions of the parts when the one-revolution clutch is disengaged. When the operator desires to engage the one-revolution clutch to give the line-space frame a line-spacing movement, he grasps the operating arm 282 and swings the same downwardly, thereby swinging the rock shaft 276 and the plate 274 in a counter-clockwise direction, Figure 9. The upward movement of the arm 272, caused by this movement of the rock shaft, allows the arms 266 and 264 to be swung upwardly by the spring 270, thereby swing the clutch-releasing arm 250 downwardly to disengage the clutch pawl 236. The acting end of the clutch pawl is then engaged with the driving wheel 242 to drive the disk 240 and the shaft 198, to which said disk is attached, through a single revolution. If the operating arm 282 is immediately released after its actuation, the clutch-controlling arm 250, following the disengagement of the driving pawl, will engage the peripheral surface 286 of the disk 240 until it drops off the shoulder 251 and rides on the surface 288, the radius of which is considerably less than that of the surface 286 to enable the arm 250 to engage the arm 254 of the pawl as the disk 240 continues its rotation.

The engagement of the arm 250 with the arm 254 of the pawl substantially at the end of a single revolution of pawl and disk disengages the pawl from the driving wheel 242. After the disengagement of the clutch, and the arrest of the forward rotation of the disk 240, the disk is caught by the engagement of the dog 255 with the shoulder 251 to prevent reverse rotation thereof under the influence of the spring 248. In order to insure the movement of the clutch-releasing arm 250 inwardly into position to engage the arm 254, immediately after said arm leaves the shoulder 251 on the disk 240, a lever 290 is fixed to the inner end of the rock shaft 252 and is provided with an arm 292 which is engaged by a pin 294 fixed in the disk 240 during the rotation of the disk produced by the engagement of the one-revolution clutch. The pin 294 is located on the disk 240 so as to engage the arm 292 just after the clutch-releasing arm 250 leaves the surface 286 on the periphery of the disk 240. The engagement of the pin 294 with the arm 292 on the lever 290 swings the rock shaft 252 in the direction to carry the rear end of the clutch-controlling arm 250 into engagement with the surface 288 on the disk 240 so that it will engage the arm 254 on the clutch pawl 236 to cause the disengagement of the clutch.

As shown and described in Patent No. 2,340,257, above referred to, the shaft 60 is longitudinally movable in its bearings on the line-space frame to engage certain clutch members, respectively, through which the line-space frame is driven forwardly or rearwardly on the platen frame and manually operable mechanism is provided for shifting said shaft. In order to prevent either of these sets of clutch members from being engaged when the one-revolution clutch is operating to impart a line-spacing movement to the line-space frame, the lever 290 is provided with a forwardly extending arm 296 projecting below a collar 298 fixed to the shaft 60. This arm is arranged to engage in a groove 300 in said collar to prevent longitudinal movement of shaft 60.

When the one-revolution clutch is out of operation, the arm 296 lies below the collar 298 so that the shaft 60 may be freely moved longitudinally to engage, respectively, the clutch members for driving the line-space frame in opposite directions. When the arms 266 and 264 are swung upwardly to swing the clutch-controlling arm 250 downwardly and thereby cause the engagement of the clutch, the arm 296 is swung upwardly into the groove 300 in the collar 298 to prevent longitudinal movement of the shaft 60.

As stated above, the one-revolution clutch is tripped automatically to cause the engagement of the same and thereby actuate the shaft 14 to impart a line-spacing movement to the line-space frame as the carriage-return mechanism returns the carriage into position to start the typing of a line. In the present construction, the one-revolution clutch is tripped as the carriage completes its carriage-return movement.

In the construction shown in this application, the projectable stop 154 engages one of the stop blocks or arresters 158, 160, or the stop plate 179 engages the arrester 180a adjacent the end of the carriage-return movement and the draft rod 162 is moved to the left a relatively short distance against the action of the spring 167a just before the movement of the carriage is finally arrested. After the movement of the carriage, in a left-hand direction, is arrested, the spring drum 28 acts on the carriage tending to move the same back to the right, and this movement of the carriage is stopped by the engagement of the holding dog 189 of the escapement mechanism with the toothed escapement wheel 187 of said mechanism. The parts are so constructed and arranged that the carriage has a slight movement to the right under the action of the spring drum 28 after the return movement thereof is arrested, and this slight right-hand movement is sufficient to relieve the friction between the projectable stop 154 and the arrester and to allow the stop to rise under the action of the spring 167a.

In the present construction, the left-hand movement of the draft rod 162 is utilized to trip the one-revolution clutch and thereby cause a line-spacing movement to be imparted to the line-space frame. To this end, an extension 302, attached at its upper edge to the slide 164 and preferably formed integral with the slide by a suitably shaped portion of the sheet metal, projects downwardly from the slide and is provided with a rearwardly turned projection 304 in which is adjustably mounted a contact screw 306 arranged to engage the lower end of a headed stud 308 projecting from the underside of the rock shaft 276. As the draft rod 162 and the slide 164 move to the left, Figure 1, during the last part of the carriage-return movement, the contact screw 306 engages the stud 308 and turns the rock shaft 276 in a counterclockwise direction, Figure 9. By this movement of the rock shaft, the one-revolution clutch is tripped in the same manner that the corresponding movement of the rock shaft, by hand, trips the clutch. With the adjustment of the control lever 202 in either of the positions shown, respectively, in Figures 8 and 10, the line-space frame will be given a line-spacing movement.

It is desirable to lock the driving pawl 178 in forward position at the end of its advance movement in order to prevent a rebound reaction of the line-space mechanism immediately after its line-spacing action. To this end, a pin 223 is mounted on the frame and extends beneath the pitman 190 so as to limit the downward movement of the right-hand or rear portion of the pitman during the latter half rotation of the crank pin 194 in a line-spacing cycle. The pin 223 is located on the frame so as to be engaged by the pitman 190 preferably just before the crank pin 194 has rotated a half revolution from starting position or just before the pin reaches dead center position as shown in Figure 13.

The left-hand or forward portion 192a of the slot 192 is somewhat wider than the diameter of the crank pin 194 and is formed with an outer curved face 192c struck on an arc having its center in the axis of the shaft 199 when the pitman initially engages the pin 223 as shown in Figure 13. The rear portion 192b of the slot 192 has a width only very slightly greater than the diameter of the crank pin 194 and its inner and outer faces are substantially straight and substantially parallel with the adjacent lower face of pitman 190. Thus the pitman is formed with a generally wedge-shaped portion 190a and with a portion 190b with substantially parallel sides interposed between the crank pin 194 and the pin 223 during the last half revolution of the crank pin in a line-spacing cycle.

Figure 15:
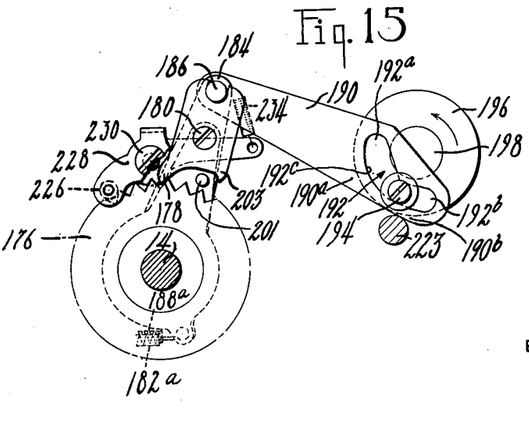

With the above construction, the reverse reaction or rebound of the line-space mechanism during the second half revolution of the crank pin in a line-spacing cycle is prevented in the following manner. Starting with the parts in the positions shown in Figure 13, at which the pitman 190 initially engages to stop pin 223, the crank pin is very close to its dead center position but has not quite reached the same. As the crank pin rotates in the direction of the arrows from this position, the pawl actuator 184 and the pitman 190 are both locked against rearward movement under the action of spring 188a by the wedging action of the portion 190a of the pitman between the pin 223 and the crank pin. The crank pin rotates in the forward portion of the slot 192 at that time, the arcuate contact face 192c of the slot engaging the crank pin and holding the pitman from moving longitudinally to the right. Thus at the end of the advance movement of the line-space mechanism, said mechanism is locked firmly against reverse movement or rebound. When the crank pin 194 reaches the right-hand portion of the slot 192 having the substantially straight side faces as shown in Figure 15, the locking action is terminated and the pitman starts to follow up the crank pin 194 and the pawl 178 is released from locking engagement with the toothed wheel 176 as shown in this figure.

The above-described mechanism will operate in a certain and reliable manner to impart accurately the required movements to the line-space frame to line space the type mechanism. The advance movements of the driving pawl 178 are produced positively and will impart uniform advance, angular movements to the toothed wheel 176.

The detent roll will firmly hold the line-space frame from displacement during the typing of a line. If it is desired to move the line-space frame by hand by moving directly the line-space frame, this roll will yield to allow such movement of the frame to be readily effected.

It is to be understood that, except as defined in the claims, the invention is not limited to the particular construction and arrangement of parts of the illustrated embodiment of the invention, but that the invention may be embodied in other forms within the scope of the claims.

Having stated the nature and object of the invention and having specifically described a construction embodying the invention in its preferred form, what is claimed is:

1. A typewriting machine comprising a substantially flat platen, a line-space frame mounted for movement forwardly and rearwardly over the platen, a type carriage mounted for movement in letter-spacing direction and return, power means, carriage return means comprising driving mechanism between the power means and the carriage for returning the carriage to position to start each line of writing and means for rendering operative said driving mechanism, a separate driving mechanism between the power means and the line-space frame comprising a clutch for advancing the line-space frame a predetermined distance in each operation of the latter driving mechanism having normally disconnected driving and driven members, connections for actuating the driving member of the clutch from the power means and means controlled from said carriage return means for connecting the driving and driven members of the clutch to render the latter mechanism operative to advance the frame.

2. A typewriting machine comprising a frame, a substantially flat platen, a line-space carriage mounted on said frame for forward and rearward movement thereon, a type carriage mounted on the line-space carriage for movement in letter-spacing direction and return, means comprising a predetermined revolution clutch for advancing the line-space carriage, power means for actuating the driving member of the clutch, means for causing the connection of the driving and driven members of the clutch to render operative said advancing means and means for disengaging the members of the clutch upon the completion of a predetermined revolution of the driven member.

3. A typewriting machining comprising a frame, a substantially flat platen, a line-space carriage mounted on said frame for forward and rearward movement thereon, a type carriage mounted on the line-space carriage for movement in letter-spacing direction and return, power means and mechanism actuated by the power means for moving the line-space carriage forwardly a predetermined distance in each operation of said mechanism to line space having provision for adjustment arranged to be set by the operator to cause said mechanism to move the line-space carriage a distance of a line space or to render said mechanism inoperative upon the line-space carriage.

4. A typewriting machine comprising a supporting structure, a substantially flat platen, a line-spacing carriage mounted on the supporting structure for forward and rearward movement thereon, a type carriage mounted on the line-spacing carriage for movement in letter-spacing direction and return, power means and mechanism actuated by the power means for moving the line-spacing carriage forwardly a predetermined distance in each operation of said mechanism to line space having provisions for adjustment arranged to be set by the operator to cause said mechanism to move the line-spacing carriage a distance corresponding to one line space or a distance corresponding to a plurality of said line spaces or to render said mechanism inoperative upon the line-spacing carriage.

5. A typewriting machine comprising a substantially flat platen, a line-space frame mounted for forward and rearward movement over the platen, a type carriage mounted on the line-space frame for movement in letter-spacing direction and return, power means, mechanism actuated by the power means for moving the line-space frame forwardly a predetermined distance in each operation of said mechanism to line space and adjustable means arranged to be set by the operator to cause said mechanism to move the line-space frame variable distances or to render said mechanism inoperative upon the line-space frame.

6. A typewriting machine comprising a supporting frame, a substantially flat platen, a line-space frame mounted on the supporting frame for forward and rearward movement over the platen, a type carriage mounted on the line-space frame for movement in letter-spacing direction and return, power means, driving mechanism between the power means and the carriage for returning the carriage to position to start each line of writing, a separate driving mechanism between the power means and the line-space frame for moving the line-space frame forwardly to line space and means for automatically rendering the latter mechanism operative as the carriage is returned.

7. In a typewriting machine, a substantially flat platen, a line-spacing carriage movable forwardly and rearwardly with relation to the platen, a letter-spacing carriage movable in advance and return directions with relation to the platen, power means, carriage return means comprising driving mechanism between the power means and the letter-spacing carriage for returning the carriage to position to start each line of writing and means for rendering operative said driving mechanism, a separate driving mechanism between the power means and the line-spacing carriage for moving the latter carriage forwardly a predetermined distance in each operation of the latter mechanism to line space and means for controlling the latter driving mechanism from the carriage return means.

8. In a typewriting machine, a substantially flat platen, a line-spacing carriage movable forwardly and rearwardly with relation to the platen, a letter-spacing carriage movable in advance and return directions with relation to the platen, power means, carriage return means comprising driving mechanism between the power means and the letter-spacing carriage for returning the carriage to position to start each line of writing and means for rendering operative said driving mechanism, a separate driving mechanism between the power means and the line-spacing carriage for moving the latter carriage forwardly a predetermined distance in each operation of the latter mechanism to line space and means for rendering operative the latter driving mechanism from the carriage return means.

9. A typewriting machine comprising a substantially flat platen, a line-spacing carriage movable forwardly and rearwardly with relation to the platen, a letter-spacing carriage mounted on the line-spacing carriage for movement in advance and return directions with relation to the platen, power means, carriage return means comprising driving mechanism between the power means and the letter-spacing carriage for returning the latter carriage to position to start each line of writing and means for rendering operative said driving mechanism, a separate driving mechanism between the power means and the line-spacing carriage for moving the latter carriage forwardly a predetermined distance in each operation of the latter mechanism to line space and means for controlling the latter driving mechanism from the carriage return means.

10. A typewriting machine comprising a supporting frame, a substantially flat platen, a line-spacing carriage mounted on said supporting frame and movable thereon forwardly and rearwardly with relation to the platen, a letter-spacing carriage mounted on the line-spacing carriage for movement in advance and return directions with relation to the platen, power means, driving mechanism between the power means and the letter-spacing carriage for returning the latter carriage to position to start each line of writing, a separate driving mechanism between the power means and the line-spacing carriage for moving the latter carriage forwardly to line space and means actuated by said first driving mechanism during the return of the carriage for automatically rendering the latter mechanism operative.

11. In a typewriting machine, a substantially flat platen, a type carriage movable over the platen in letter-spacing and return directions, power means, carriage return means comprising driving connections driven by the power means for returning the type carriage to position to start each line of writing and means for throwing said driving connections into operation, a separate mechanism driven by the power means for moving relatively the platen and the type carriage a predetermined distance in each operation of the latter mechanism to line space and means operated by said carriage return means for rendering operative the latter mechanism.

12. In a typewriting machine, a substantially flat platen, a type carriage movable over the platen in letter-spacing and return directions, power means, mechanism driven by the power means for returning the type carriage to position to start each line of writing, a separate mechanism driven by the power means for moving relatively the platen and the type carriage a predetermined distance in each operation of the latter mechanism to line space and means operated by the carriage returning mechanism for rendering operative the latter mechanism.

13. A typewriting machine comprising a substantially flat platen, a carriage movable in opposite directions over the platen, a type carriage movable in opposite directions on said first carriage, power means, mechanism actuated by the power means for moving one of said carriages to line space comprising a rotary shaft journaled in the latter carriage, a fixed rack, gearing connections between the said shaft and said rack, a toothed wheel mounted on said shaft, an oscillatory driving pawl for engaging said wheel to drive the same, a predetermined revolution clutch for producing oscillating movements of said pawl and mechanism for controlling said clutch.

14. A typewriting machine comprising a substantially flat platen, a carriage movable in opposite directions over the platen, a type carriage movable in opposite directions on said first carriage, power means, mechanism actuated by the power means for moving one of said carriages forwardly to line space comprising a rotary shaft journaled in the latter carriage, a fixed rack, gearing connections between the shaft and said rack, a toothed wheel fixed to the shaft, a driving pawl for driving the wheel, driving connections comprising a predetermined revolution clutch for operating the pawl from the power means to advance the wheel a distance of a predetermined number of teeth in each actuation of the pawl and means for tripping the clutch.

15. A machine of the class described comprising a substantially flat platen, a frame movable forwardly and rearwardly over the platen, a type carriage mounted on said frame for movement in letter-spacing direction and return, power means, mechanism operated by the power means for advancing the frame to a predetermined line-spaced position and means coacting with the latter mechanism to lock the frame against rebound following said advancing movement.

16. A machine of the class described comprising a substantially flat platen, a frame movable forwardly and rearwardly over the platen, a type carriage mounted on said frame for movement in letter-spacing direction and return, power means, mechanism operated by the power means for advancing the frame to a predetermined line-spaced position comprising a toothed wheel, a pawl for engaging said wheel and power-actuated means for moving the pawl to drive the wheel and locking means acting on said pawl-moving means to lock the frame against rebound following the forward movement thereof.

17. A record making machine comprising record making means, a carriage movable in opposite directions transversely of the machine, means for moving the carriage in one direction to shift the point at which a record is made laterally of a work sheet, power means, driving mechanism between the power means and the carriage for returning the carriage, line-space mechanism, a separate driving mechanism between the power means and the line-space mechanism and means for automatically rendering the latter mechanism operative as the carriage is returned.

18. A record making machine comprising record making mechanism, a carriage movable in opposite directions across the machine, means for moving the carriage in one direction during a record making operation, power means, driving mechanism between the power means and the carriage for returning the carriage, line-space mechanism, a separate driving mechanism between the power means and the line-space mechanism to operate the line-space mechanism, means for rendering the latter driving mechanism operative and mechanism for controlling the latter means from the carriage return mechanism.

19. A record making machine comprising record making means, a carriage movable in opposite directions transversely of the machine, means for moving the carriage in one direction to shift the point at which the record is made laterally of a work sheet, power means, driving mechanism between the power means and the carriage for returning the carriage in the opposite direction, line-space mechanism, a separate driving mechanism between the power means and the line-space mechanism to actuate the line-space mechanism and means operated by the carriage return mechanism for rendering the latter driving mechanism operative at a predetermined point in the return movement of the carriage.

20. A record making machine comprising record making means, a carriage movable in opposite directions transversely of the machine, means for moving the carriage in one direction to shift the point at which the record is made laterally of a work sheet, power means, driving mechanism between the power means and the carriage for returning the carriage in the opposite direction, line space mechanism, a separate driving mechanism between the power means and the line-space mechanism comprising a predetermined revolution clutch for operating the line-space mechanism and means operated by the carriage return mechanism for tripping said clutch.

21. A record making machine comprising record making means, a carriage movable in opposite directions transversely of the machine, means for moving the carriage in one direction to shift the point at which the record is made laterally of a work sheet, mechanism for returning the carriage in the opposite direction, power means, driving mechanism between the power means and the carriage for returning the carriage, line-spacing mechanism, a separate driving mechanism between the power means and the line-space mechanism to actuate the line-space mechanism and means for rendering the line-space driving mechanism operative automatically in timed relation to the return movement of the carriage.

OSCAR J. SUNDSTRAND.